(12) United States Patent
 Zimmel

(10) Patent No.: US 12,147,080 B2
(45) Date of Patent: Nov. 19, 2024

(54) FIBER OPTIC CONNECTOR WITH REAR CAP

(71) Applicant: COMMSCOPE TECHNOLOGIES LLC, Hickory, NC (US)

(72) Inventor: Steven Conrad Zimmel, Minneapolis, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 253 days.

(21) Appl. No.: 17/613,885

(22) PCT Filed: May 21, 2020

(86) PCT No.: PCT/US2020/034060
§ 371 (c)(1),
(2) Date: Nov. 23, 2021

(87) PCT Pub. No.: WO2020/237085
PCT Pub. Date: Nov. 26, 2020

(65) Prior Publication Data
US 2022/0236495 A1   Jul. 28, 2022

Related U.S. Application Data

(60) Provisional application No. 62/852,199, filed on May 23, 2019.

(51) Int. Cl.
*G02B 6/38* (2006.01)

(52) U.S. Cl.
CPC ......... *G02B 6/3861* (2013.01); *G02B 6/3849* (2013.01); *G02B 6/3869* (2013.01); *G02B 6/3887* (2013.01)

(58) Field of Classification Search
CPC .. G02B 6/3849; G02B 6/3861; G02B 6/3869; G02B 6/3887; G02B 6/38875; G02B 6/3888
See application file for complete search history.

(56) References Cited

U.S. PATENT DOCUMENTS

| 6,419,402 B1 * | 7/2002 | Zimmel | G02B 6/3869 385/86 |
| 7,682,088 B2 * | 3/2010 | Nielson | G02B 6/3888 385/53 |

(Continued)

FOREIGN PATENT DOCUMENTS

| CN | 104516060 A | 4/2015 |
| CN | 107636505 A | 1/2018 |

OTHER PUBLICATIONS

Office Action for Chinese Patent Application No. 202080036898.1 mailed Aug. 3, 2022, 18 pages.

(Continued)

*Primary Examiner* — Omar R Rojas
(74) *Attorney, Agent, or Firm* — Merchant & Gould P.C.

(57) ABSTRACT

The present disclosure provides a system and method for connecting an optical fiber to a ferrule. The system and method facilitate the process of epoxying the optical fiber in a manner that avoid inadvertently adhering the fiber to the side of a connector housing, which can result in breakage of the optical fiber when in the field. The system and method provide a mechanism for easily epoxying the optical fiber to the ferrule while still allowing for sonic radial movement of the optical fiber within the connector housing, which is desirable. The system and method incorporate an end cap that centers the optical fiber in the connector housing during the connection process and also acts as a strain relief when in the field.

16 Claims, 12 Drawing Sheets

(56) References Cited

U.S. PATENT DOCUMENTS

| | | | |
|---|---|---|---|
| 8,442,371 B2 * | 5/2013 | Oyama | C03C 25/1065 |
| | | | 385/102 |
| 8,616,784 B2 * | 12/2013 | Saito | G02B 6/3846 |
| | | | 385/86 |
| 8,702,323 B2 | 4/2014 | Nhep | |
| 2009/0220199 A1 | 9/2009 | Yazaki et al. | |
| 2012/0017438 A1 | 1/2012 | Hogue | |
| 2012/0321257 A1 | 12/2012 | Lu et al. | |
| 2014/0254988 A1 | 9/2014 | Nhep | |
| 2015/0098681 A1 | 4/2015 | Iizumi et al. | |
| 2018/0348447 A1 | 12/2018 | Nhep et al. | |
| 2019/0041584 A1 | 2/2019 | Coenegracht et al. | |

OTHER PUBLICATIONS

Notice of Allowance for Chinese Application No. 202080036898.1 mailed Aug. 29, 2023.
International Search Report and Written Opinion of the International Searching Authority for International Patent Application No. PCT/US2020/034060 mailed Aug. 26, 2020, 11 pages.
Extended European Search Report for Application No. 20809704.8 mailed May 9, 2023.

* cited by examiner

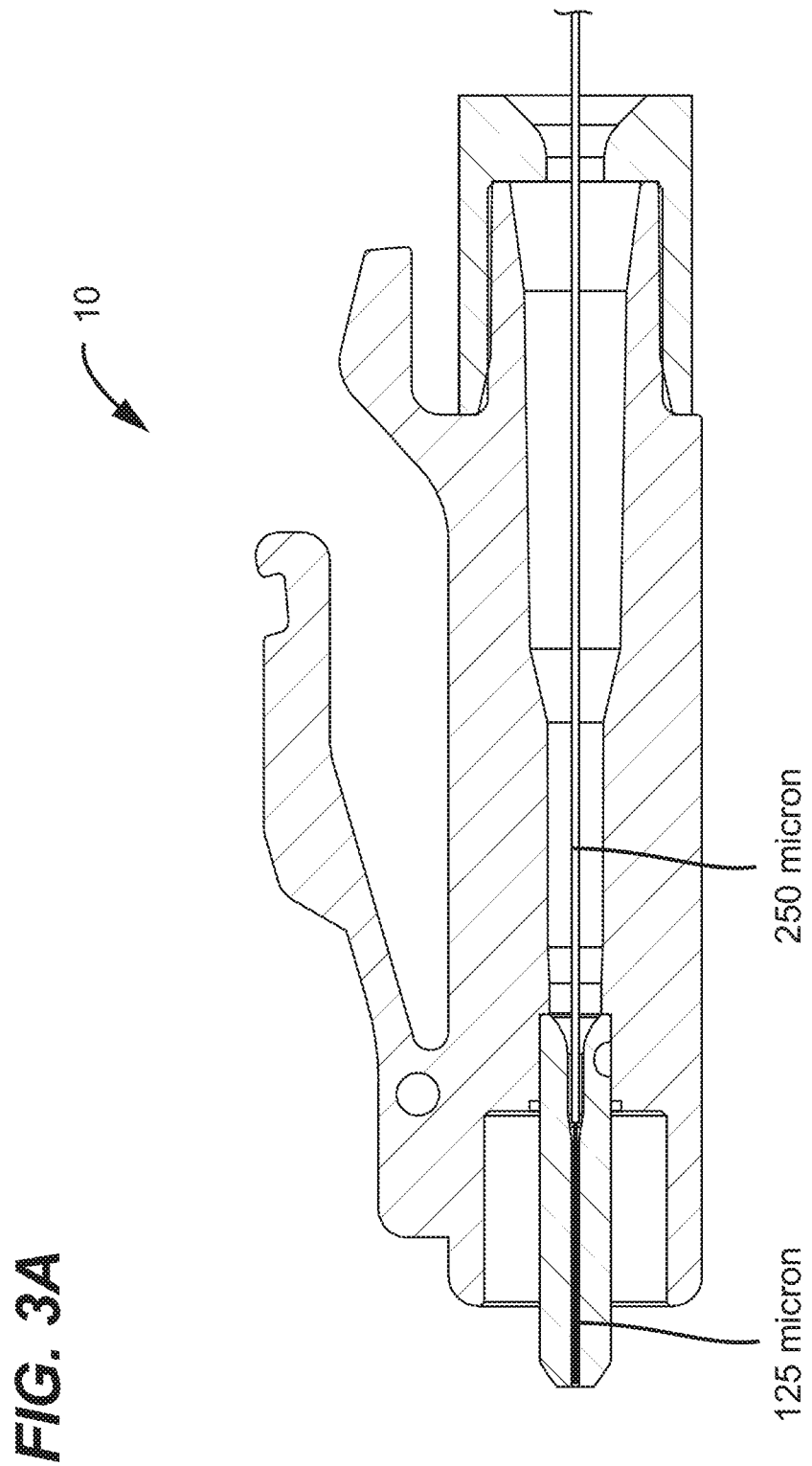

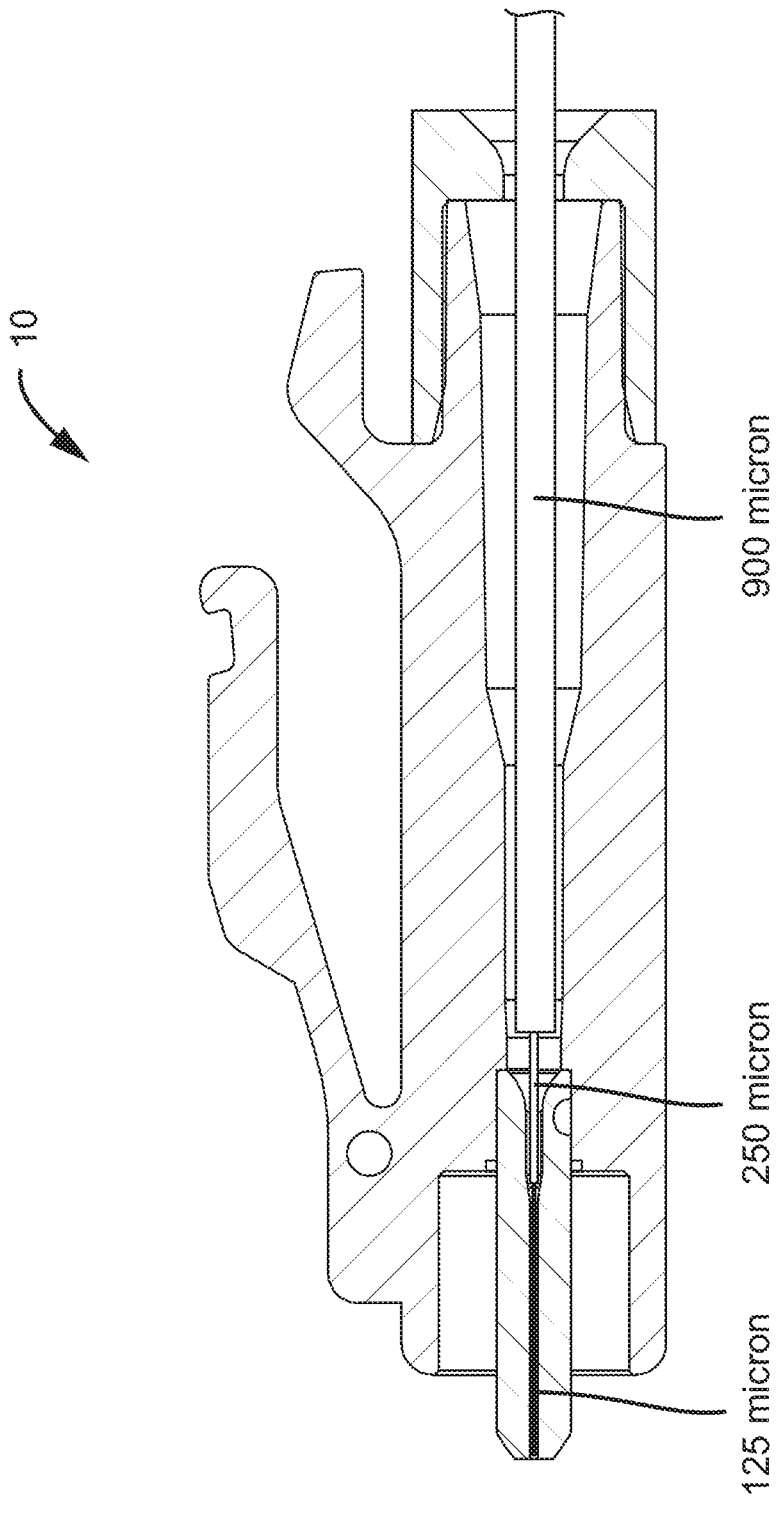

FIBER OPTIC CONNECTOR WITH REAR CAP

CROSS-REFERENCE TO RELATED APPLICATION

This application is a National Stage Application of PCT/US2020/034060, filed on May 21, 2020, which claims the benefit of U.S. Patent Application Ser. No. 62/852,199, filed on May 23, 2019, the disclosures of which are incorporated herein by reference in their entireties. To the extent appropriate, a claim of priority is made to each of the above disclosed applications.

FIELD OF THE INVENTION

The present invention relates to terminating the ends of fiber optic cables in fiber optic connectors.

BACKGROUND OF THE INVENTION

Typically the end of a fiber optic cable is terminated by a fiber optic connector by adhering the fiber within the cable to a ferrule of the connector. Epoxy is commonly used to adhere the fiber to the ferrule. It can be difficult to deliver the epoxy in such a way as to adhere the fiber into the ferrule without also resulting in inadvertently adhering portions of the fiber to other parts of the connector. If a portion of the fiber is inadvertently adhered to the rear part of the ferrule, the fiber would not be free to move and flex based on the direction of pull on the fiber. This lack of freedom of movement can result in failure of the optical fiber. There is a need to provide systems and methods to facilitate the process of connecting the fiber to the ferrule without also inadvertently adhering portions of the fiber to other parts of the connector.

SUMMARY

The present disclosure provides a system and method for connecting an optical fiber to a ferrule. The system and method facilitate the process of epoxying the optical fiber in a manner that avoid inadvertently adhering the fiber to the side of a connector housing, which can result in breakage of the optical fiber when in the field. The system and method provide a mechanism for easily epoxying the optical fiber to the ferrule while still allowing for radial movement of the optical fiber within the connector housing, which is desirable. The system and method incorporate an end cap that centers the optical fiber in the connector housing during the connection process and also acts as a strain relief when in the field.

BRIEF DESCRIPTION OF THE DRAWINGS

FIGS. 3, 3A and 3B are longitudinal cross sectional views of the fiber optic connector of FIG. 1;

DETAILED DESCRIPTION

Figure 1:
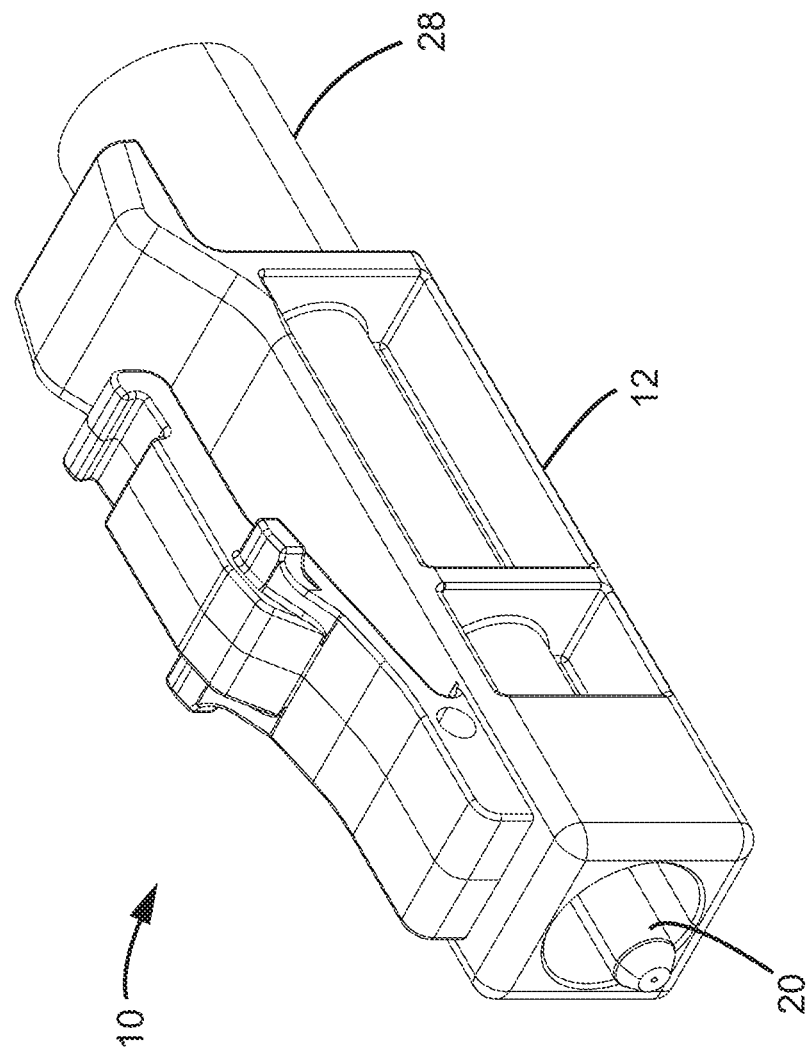
FIG. 1 is an isometric view of the fiber optic connector of the present disclosure.
Figure 2:
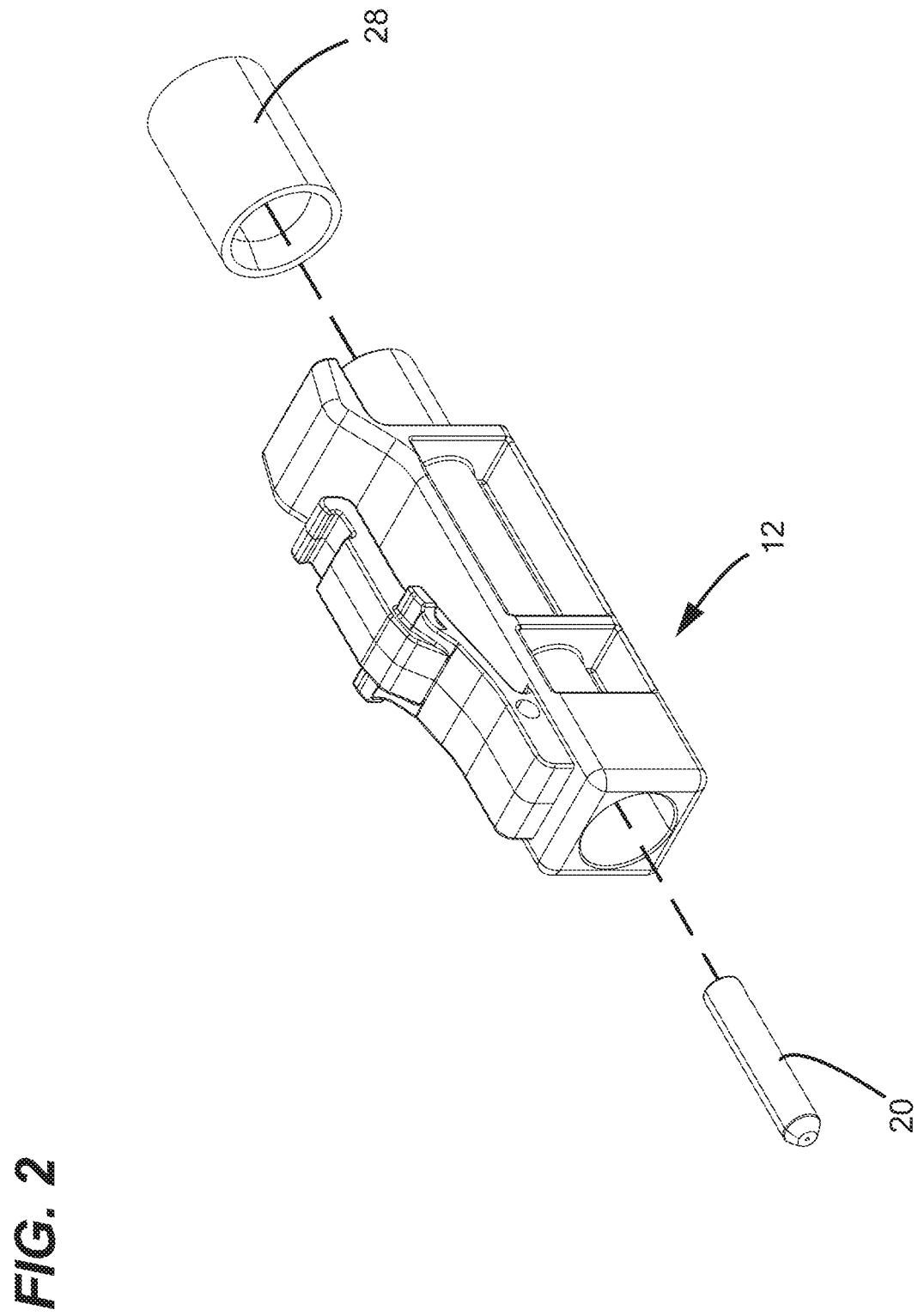
FIG. 2 is an isometric view of the fiber optic connector of FIG. 1 partially disassembled.
Figure 3:
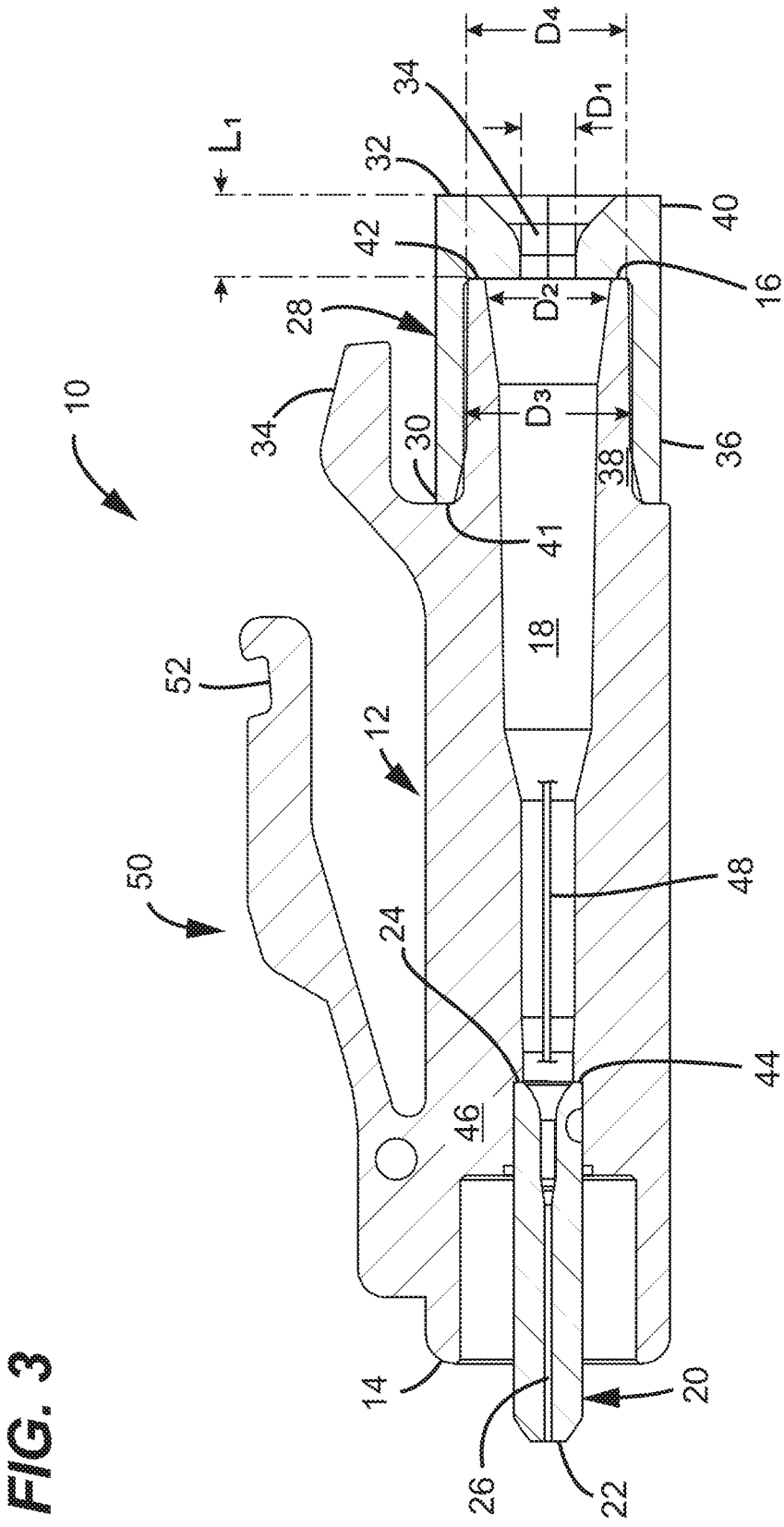
Figure 4:
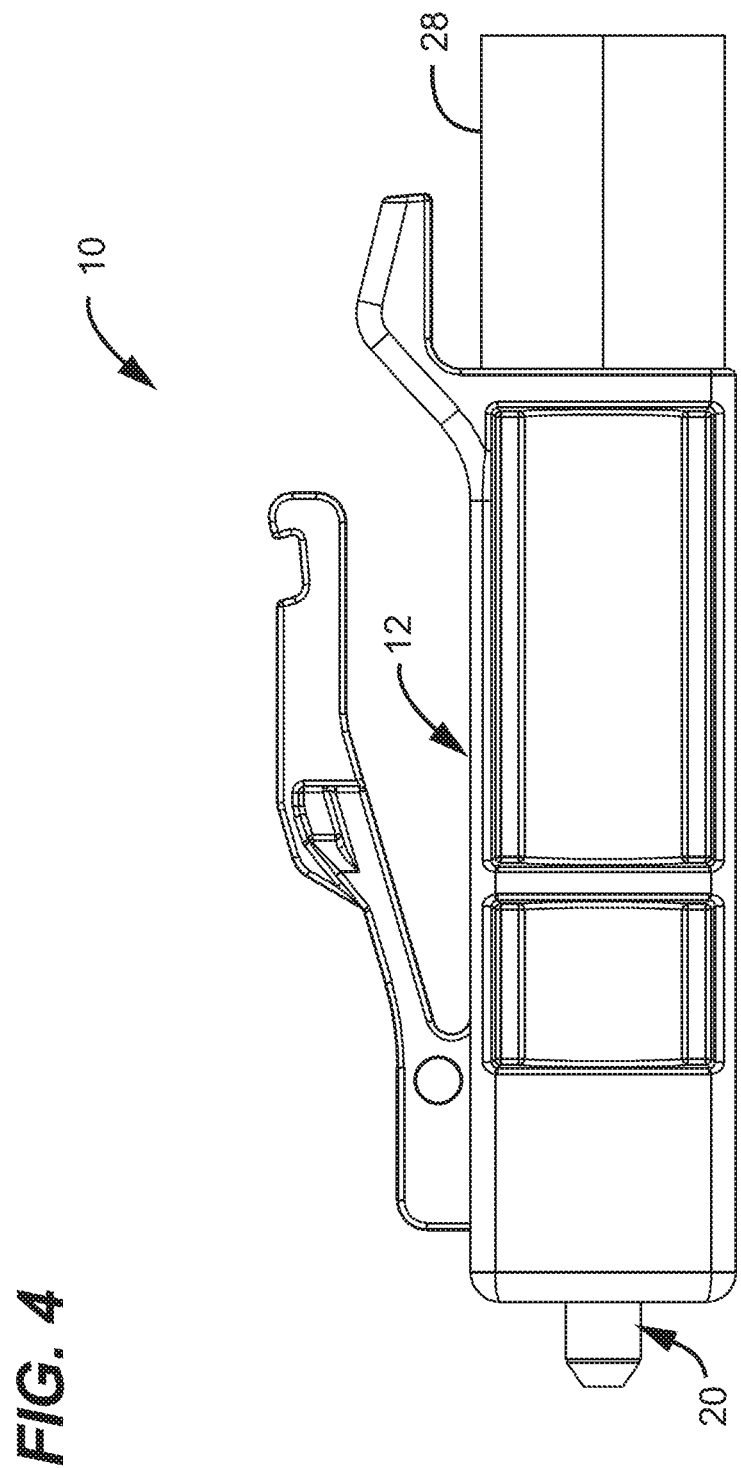
FIG. 4 is a side view of the fiber optic connector of FIG. 1.
Figure 5:
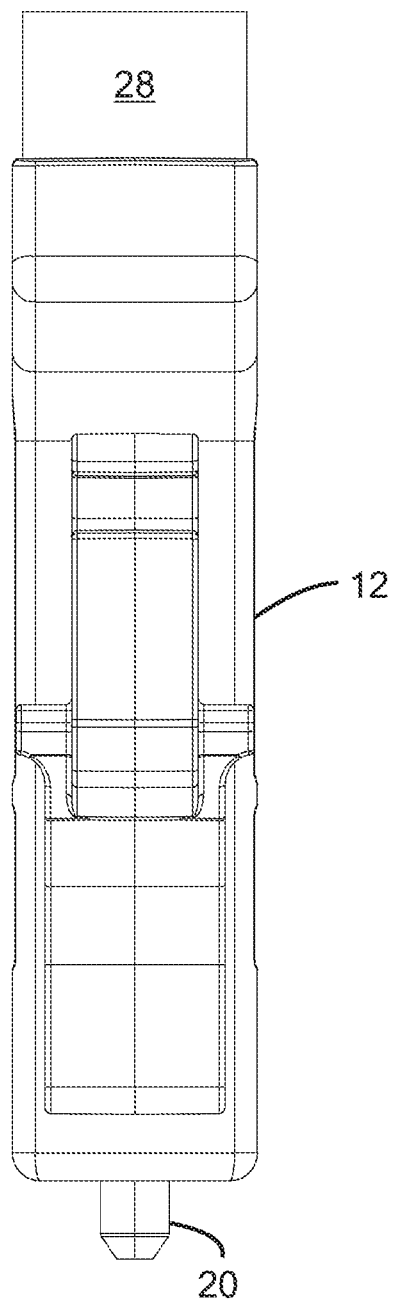
FIG. 5 is a top view of the fiber optic connector of FIG. 1.
Figure 6:
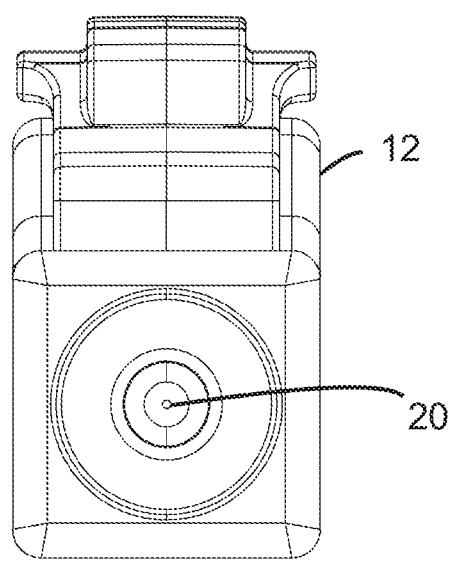
FIG. 6 is a front view of the fiber optic connector of FIG. 1.
Figure 7:
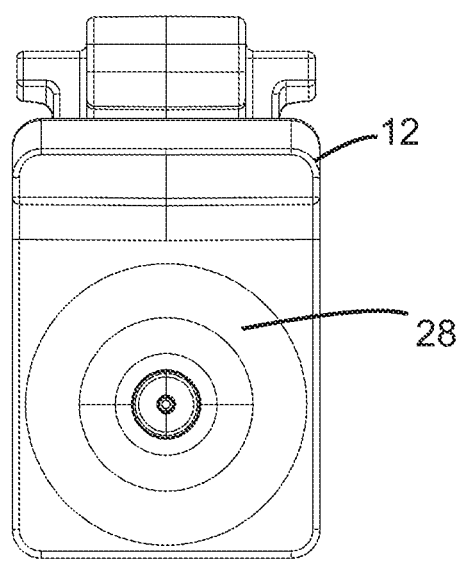
FIG. 7 is a rear view of the fiber optic connector of FIG. 1.
Figure 8:
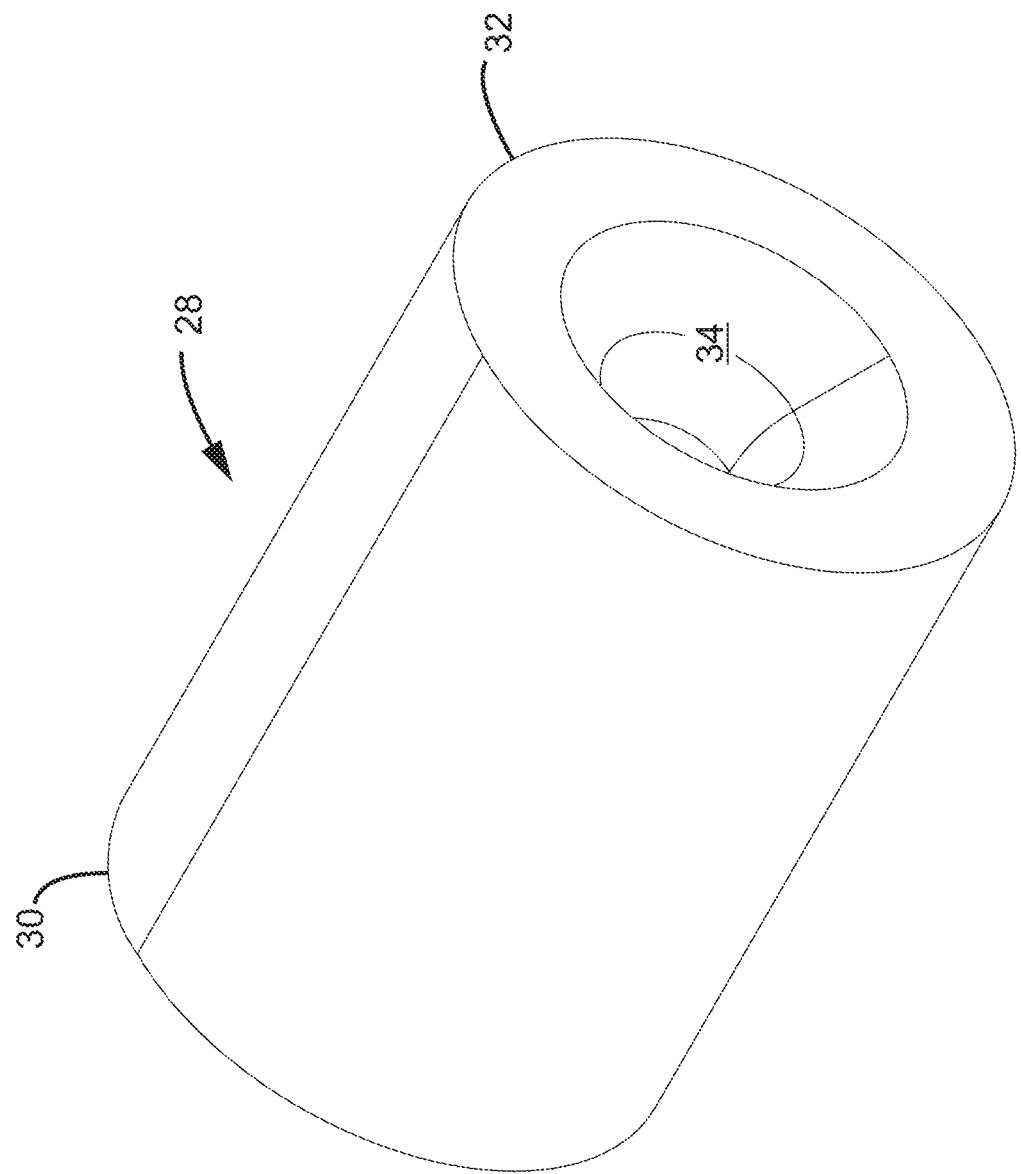
FIG. 8 is isometric view of a component of the fiber optic connector of FIG. 1.
Figure 9:
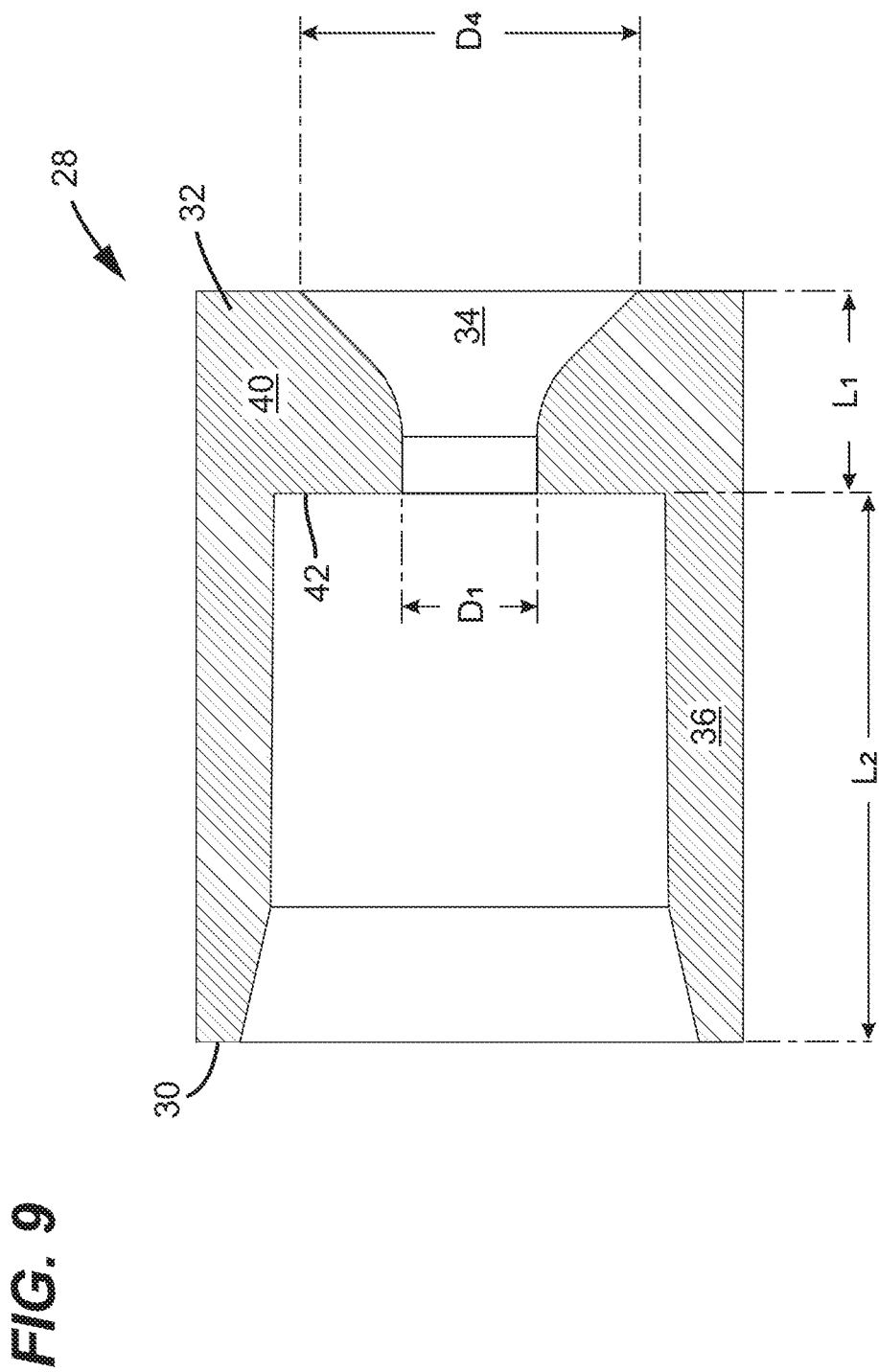
FIG. 9 is a cross sectional view of the component of FIG. 8.
Figure 10:
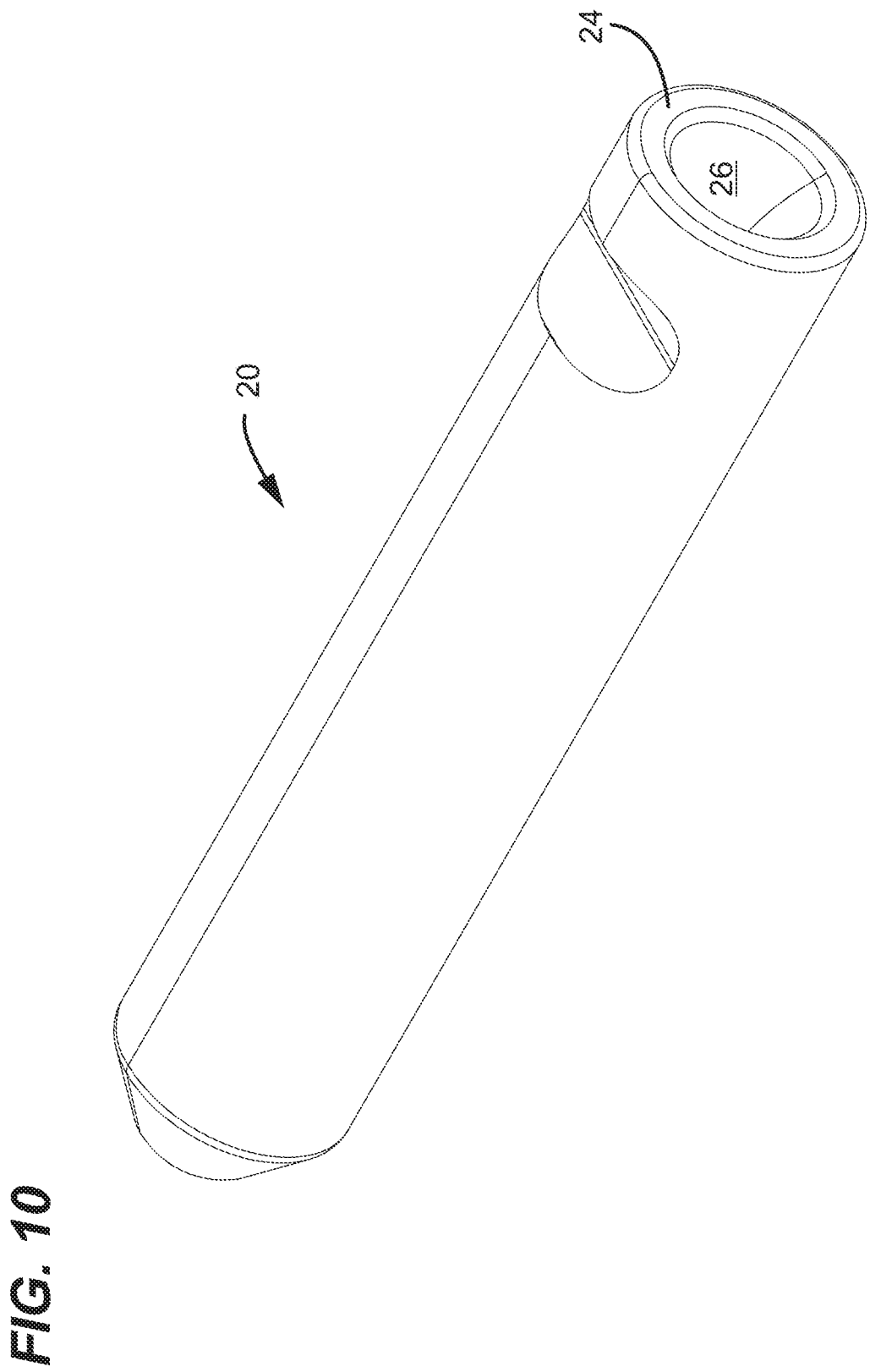
FIG. 10 is isometric view of a component of the fiber optic connector of FIG. 1.
Figure 11:
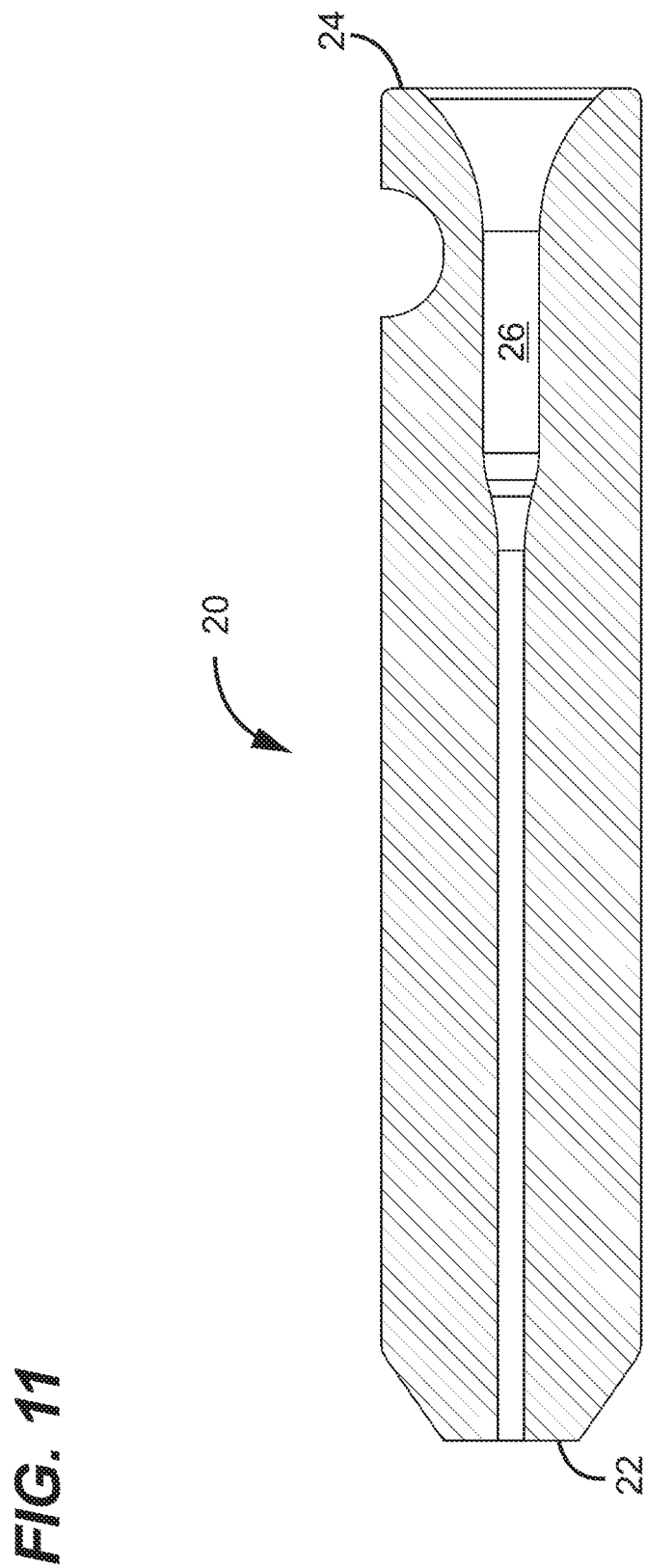
FIG. 11 is a cross sectional view of the component of FIG. 10.

Referring to the figures, the fiber optic connector and method of the present disclosure are described in further detail. In the depicted embodiment, the fiber optic connector 10 includes a connector housing 12. The connector housing 12 includes a first end 14 and a second end 16. The connector housing includes a connector housing axial passage 18 that extends from the first end 14 to the second end 16 of the connector housing 12.

In the depicted embodiment, the axial passage 18 of the connector housing 12 has a circular cross section. In the depicted embodiment, the axial passage 18 is tapered with a smaller diameter portion at the first end 14 of the connector housing and a larger diameter portion at the second end 16. The second end 16 of the connector housing has an internal diameter D2. In the depicted embodiment the connector housing 12 also includes a cantilevered latch 50 that includes a finger nail notch 52 that extend rearward. The cantilevered latch 50 is attached to the first end portion of the connector housing 12. In the depicted embodiment a finger tab 54 extends rearward from the second end 16 of the connector housing 12 and provides a bump for a finger to engage. The finger tab 54 aids in withdrawing the connector from an adapter (not shown). It should be appreciated that many alternative configurations are also possible.

In the depicted embodiment, the connector housing 12 has a single piece construction and is integrally formed. In the depicted embodiment the connector housing 12 is that of an LC style connector. It should be appreciated that the principles of the present disclosure can be applied to a number of other style of connectors including, for example, SC style connectors.

The fiber optic connector 10 of the depicted embodiment also includes a ferrule 20. The ferrule 20 has a first end 22 and a second end 24. In the depicted embodiment, the second end 24 of the ferrule 20 is secured to the first end 14 of the connector housing 12. In the depicted embodiment, the ferrule 20 includes a ferrule axial passage 26 that extends from the first end 22 to the second end 24 of the ferrule 20.

In the depicted embodiment the ferrule axial passage 26 has a circular cross section and is sized to receive an end of an optical fiber. In the depicted embodiment, the ferrule axial passage 26 is coaxially arranged with the connector housing axial passage 18. In the depicted embodiment, the ferrule 20 is axially fixed to the connector housing 12. In the depicted embodiment, the ferrule 20 is not spring loaded, but can be configured to mate with a spring loaded adjacent ferrule of another connector. In the depicted embodiment, the second end 24 of the ferrule 20 abuts an inner annular shoulder 44 in the connector housing 12. The first end 22 of the ferrule 20 extend beyond the first end 14 of the connector housing 12. It should be appreciated that many alternative configurations are also possible. For example, in alternative embodiment the ferrule may be axially movable rather than fixed.

The fiber optic connector 10 of the depicted embodiment includes an end cap 28. The end cap 28 includes a first end 30 and a second end 32. In the depicted embodiment, the first end 30 of the end cap 28 is secured to the second end 16 of the connector housing 12. In the depicted embodiment, the end cap 28 has an end cap axial passage 34 that extends from the first end 30 to the second end 32 of the end cap 28. The end cap axial passage 34 has a circular cross section. The end cap axial passage 34 is coaxially arranged with the connector housing axial passage 18. It should be appreciated that many alternative configurations are also possible.

In the depicted embodiment, the end cap axial passage 34 has an end cap minimum diameter D1. In the depicted embodiment, the internal diameter of the axial passage 18 at the second end 16 of the connector housing D2 is greater than D1. In the depicted embodiment, D1 is at least 40 percent less than D2. In the depicted embodiment D1 is between 0.25 mm and 1.25 mm and D2 is between 2.0 mm and 3.0 mm. In the depicted embodiment D1 is between 0.90 mm and 1.10 mm and D2 is between 2.20 mm and 2.3 mm. The smaller size of D1 relative to D2 results in the end cap being able to serve as a centering structure for an optical fiber 48 during the epoxying process. The optical fiber 48 can rest against an edge of the end cap axial passage 34 and be held off of the side surfaces of the second end of the axial passage 18 of the connector housing 12. This arrangement makes it less likely that any length of the fiber 48 will inadvertently be adhered to the inside surface of the second end of the axial passage 18. In the depicted embodiment, D1 is large enough to receive the fiber 48 and still provide enough room to insert a syringe to deliver epoxy to the second end 24 of the ferrule 20. This allows for the end cap 28 to be secured to the connector housing 12 prior to epoxying the fiber to the ferrule. However, it should be appreciated that the process of epoxying the fiber to the ferrule can occur prior to the end cap 28 being secured to the connector housing 12. It should be appreciated that many alternative configurations and orders of operations are also possible.

In the depicted embodiment, a first end portion 36 of the end cap 28 fits over a cylindrical second end portion 38 of the connector housing 12, and a second end portion 40 of the end cap 28 extends away from the second end 16 of the connector housing 12. In the depicted embodiment, the first end 30 of the end cap abuts an annular shoulder 41 on the second end portion 38 of the connector housing 12. In the depicted embodiment, the second end 16 of the connector housing 12 abuts an annular shoulder 42 in the end cap 28. In the depicted embodiment, the first end portion 36 of the end cap 28 has a cylindrical inner profile and the second end portion 38 of the connector housing 12 has a cylindrical outer profile. In the depicted embodiment, the end cap 28 is manually slid over the second end portion 38 of the connector housing 12. In the depicted embodiment, the end cap 28 stretches in this process and is held in place on the connector housing 12 with friction. The cylindrical second end portion 38 of the connector housing 12 has a diameter D3.

In the depicted embodiment D3 is between 2.75 mm and 3.30 mm. In the depicted embodiment D3 is between 2.90 mm and 3.20 mm. The second end portion 40 of the end cap 28 has a length L1 that is less than the diameter D3. In the depicted embodiment L1 is between 1.0 mm to 3.0 mm. In the depicted embodiment the L1 is between 1.25 to 1.75 mm. In the depicted embodiment the total length of the end cap (L1 plus L2) is between 5.00 mm to 6.00 mm. It should be appreciated that many other alternative configurations are also possible.

In the depicted embodiment, the end cap 28 is constructed of a resilient material. In the depicted embodiment, the end cap is constructed of TPV (thermoplastic vulcanite) (e.g., Santoprene). In the depicted embodiment, the relative soft construction of the end cap along with its shape and size facilitates its function as a strain relief. It should be appreciated that many alternative configurations and material choices are also possible.

In the depicted embodiment, the end cap axial passage 34 in the second end portion 40 of the end cap 28 has a funnel shape having a maximum diameter D4 at the second end 32 of the end cap 28. In the depicted embodiment D4 is between 2.00 mm and 3.00 mm. In the depicted embodiment D4 is between 2.25 mm and 2.75 mm. In the depicted embodiment, the end cap axial passage 34 has a smooth and continuous transition area from its minimum diameter D1 to its maximum diameter D4. In the depicted embodiment, the axial passage is arranged and configured to provide strain relief for an optical fiber extending through the connector 10. The transition from D1 to D4 forms a curved longitudinal cross-sectional profile. The fiber 48 is supported along that curve when in the field. When the fiber is pulled, it can shift positions towards the direction of pull radially within the end cap 28 and rest against the smooth side of the end cap 28. The radial movement of the fiber 48 relative to the end cap axial passage 34 on response to the fiber being pulled sideways is desirable. To facilitate the movement, it is desirable that the fiber 48 be connected to the ferrule 20 at its distal end but not glued to the sides of the second end portion of the connector housing axial passage 18. It should be appreciated that many alternative configurations are also possible.

In the depicted embodiment, the fiber optic connector 10 can include the optical fiber 48 including an inner fiber at 125 microns in outer diameter, an outer coating at 250 microns in outer diameter, and a buffer layer at 900 microns in outer diameter. The outer coating is positioned around the inner fiber and the buffer layer is positioned around the outer coating. A first end of the optical fiber is fixed to the ferrule 20 and a second end of the optical fiber extends out of the second ends of the connector housing 12 and end cap 28. The second end of the optical fiber is free to move radially in the end cap axial passage 34. It should be appreciated that many alternative configurations are also possible.

A method of connecting an optical fiber to a fiber optic connector is also provided. The method includes the step of providing a ferrule 20 fixed to a first end portion 46 of a connector housing 12. In the depicted embodiment, the method includes the step of connecting an end cap 28 to a second end portion 38 of the connector housing 12. In the depicted embodiment the end cap 28 has an axial passage 34 with a minimum diameter D1 that is less than an inner diameter D2 of a second end 16 of the connector housing 12. This arrangement facilitates centering of the fiber and minimizes the risk of inadvertently gluing the fiber to the second end portion of the connector housing 12. The method includes the step of providing epoxy to the ferrule 20. The method also includes the step of inserting the fiber 48 into the ferrule 20. The method also includes the step of curing the epoxy.

In the depicted embodiment, the step of connecting the end cap 28 to the second end of the connector housing 16 can occur before the step of inserting the fiber into the ferrule. In such an embodiment, the ferrule could be provided with epoxy prior to the end cap 28 being secured or, alternatively, with a syringe after the end cap 28 is secured. Alternatively, the step of connecting the end cap 28 to the second end of the connector housing 12 can occurs after the step of inserting the fiber into the ferrule. In such an embodiment, the end cap could be placed around the fiber at its distal end prior to the distal end being epoxied to the ferrule. The fiber could be inserted into the ferrule before or after the epoxy is provide to the ferrule. The cap configuration and geometry allows for the steps of the method to be performed in a number of different orders. It should be appreciated that many alternative configurations are also possible.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic connector including:
   an integrally formed connector housing having a single piece construction, the connector housing including a first end and a second end, the connector housing including a connector housing axial passage that extends from the first end of the connector housing to the second end of the connector housing;
   a ferrule, the ferrule having a first end and a second end, the first end of the ferrule extending beyond the first end of the connector housing, the second end of the ferrule abutting an annular shoulder of the connector housing and secured to the first end of the connector housing, the ferrule including a ferrule axial passage that extends from the first end of the ferrule to the second end of the ferrule, wherein the ferrule axial passage is coaxially arranged with the connector housing axial passage;
   an end cap, the end cap including a first end and a second end, the first end of the end cap secured to the second end of the connector housing, the end cap having an end cap axial passage that extends from the first end of the end cap to the second end of the end cap, wherein the end cap axial passage is coaxially arranged with the connector housing axial passage, wherein a first end portion of the end cap fits over a cylindrical second end portion of the connector housing having a diameter D3, and a second end portion of the end cap extending between the second end and an inner annular shoulder of the end cap has a length L1 extends away from the second end of the connector housing, wherein the length L1 is less than the diameter D3;
   wherein the end cap axial passage has an end cap minimum diameter D1, wherein the second end of the connector housing has an internal diameter D2, wherein the internal diameter D2 of the second end of the connector housing is greater than the end cap minimum diameter D1.

2. The connector of claim 1, wherein the first end portion of the end cap abuts an annular shoulder on the second end portion of the connector housing, and wherein the second end of the connector housing abuts the inner annular shoulder in the end cap.

3. The connector of claim 1, wherein the first end portion of the end cap has a cylindrical inner profile and the second end portion of the connector housing has a cylindrical outer profile.

4. The connector of claim 1, wherein the end cap is constructed of a resilient material.

5. The connector of claim 1, wherein the end cap is constructed of a thermoplastic vulcanizate material.

6. The connector of claim 1, wherein the end cap axial passage in the second end portion of the end cap has a funnel shape having a maximum diameter D4 at the second end of the end cap.

7. The connector of claim 1, wherein the end cap axial passage has a smooth and continuous transition area from its minimum diameter D1 to its maximum diameter D4.

8. The connector of claim 7, wherein the end cap axial passage is arranged and configured to provide strain relief for an optical fiber extending through the connector.

9. The connector of claim 8, wherein D1 is at least forty percent less than D2.

10. The connector of claim 1, further comprising an optical fiber cable including an inner fiber at 125 microns in outer diameter, an outer coating at 250 microns in outer diameter, and a buffer layer at 900 microns in outer diameter, the outer coating positioned around the inner fiber and the buffer layer positioned around the outer coating; wherein a first end of the optical fiber is epoxied to the ferrule and a second end of the optical fiber extends out of the second end of the connector housing and second end of the end cap, wherein the second end of the optical fiber is free to move radially in the end cap axial passage.

11. The connector of claim 1, wherein the connector housing is an LC style connector.

12. A method of connecting an optical fiber to a fiber optic connector comprising the steps of:
   providing an integrally formed connector housing having a single piece construction;
   providing a ferrule fixed to the connector housing, wherein a first end of the ferrule extends beyond a first end of the connector housing, and a second end of the ferrule abuts an annular shoulder of the connector housing;
   connecting an end cap to a second end portion of the connector housing, wherein the end cap has an axial passage having a minimum diameter that is less than an inner diameter of a second end of the connector housing, wherein a first end portion of the end cap fits over a cylindrical second end portion of the connector housing having a diameter D3, and a second end portion of the end cap extending between the second end and an inner annular shoulder of the end cap has a length L1 extends away from a second end of the connector housing, wherein the length L1 is less than the diameter D3;
   providing epoxy to the ferrule;
   inserting the fiber into the ferrule; and
   curing the epoxy.

13. The method of claim 12, wherein the step of connecting the end cap to the second end of the housing occurs before the step of inserting the fiber into the ferrule.

14. The method of claim 13, wherein the step of connecting the end cap to the second end of the housing occurs before the step of providing epoxy to the ferrule.

15. The method of claim 13, wherein the step of connecting the end cap to the second end of the housing occurs after the step of providing epoxy to the ferrule.

16. The method of claim 12, wherein the step of connecting the end cap to the second end of the housing occurs after the step of inserting the fiber into the ferrule.

* * * * *

UNITED STATES PATENT AND TRADEMARK OFFICE
CERTIFICATE OF CORRECTION

PATENT NO. : 12,147,080 B2  
APPLICATION NO. : 17/613885  
DATED : November 19, 2024  
INVENTOR(S) : Steven Conrad Zimmel Page 1 of 1

It is certified that error appears in the above-identified patent and that said Letters Patent is hereby corrected as shown below:

On the Title Page

(57) Abstract, Line 8: "allowing for sonic radial" should read --allowing for some radial--

Signed and Sealed this
Twenty-second Day of April, 2025

Coke Morgan Stewart
*Acting Director of the United States Patent and Trademark Office*